(12) United States Patent
Handa

(10) Patent No.: US 8,636,165 B2
(45) Date of Patent: Jan. 28, 2014

(54) INSULATED GAS TANK WITH PRESSURE REDUCTION DEVICE

(75) Inventor: Kiyoshi Handa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 13/013,411

(22) Filed: Jan. 25, 2011

(65) Prior Publication Data

US 2011/0180551 A1     Jul. 28, 2011

(30) Foreign Application Priority Data

Jan. 25, 2010  (JP) .................... 2010-013440

(51) Int. Cl.
*B65D 90/34*     (2006.01)

(52) U.S. Cl.
USPC ............................. 220/89.4; 220/89.1; 137/79

(58) Field of Classification Search
USPC .............. 220/89.1, 89.2, 89.4; 137/72, 79, 73
See application file for complete search history.

(56) References Cited

U.S. PATENT DOCUMENTS

| | | | |
|---|---|---|---|
| 3,830,326 A * | 8/1974 | Hartung ......................... | 180/305 |
| 4,934,553 A * | 6/1990 | McCarthy ..................... | 220/567.2 |
| 5,632,297 A | 5/1997 | Sciullo et al. | |
| 2003/0217770 A1* | 11/2003 | Schultz et al. ................ | 137/73 |
| 2009/0101314 A1* | 4/2009 | Lindner ........................ | 165/104.26 |

FOREIGN PATENT DOCUMENTS

| | | |
|---|---|---|
| EP | 0668468 A1 | 8/1995 |
| JP | 5-235573 | 9/1993 |
| JP | 9-53797 | 2/1997 |
| JP | 10-110121 | 4/1998 |
| JP | 2001-130271 | 5/2001 |
| JP | 2003-247700 | 9/2003 |
| JP | 2004-185831 | 7/2004 |
| JP | 2005-123184 | 5/2005 |
| JP | 2005-315294 | 11/2005 |
| JP | 2006-13134 | 1/2006 |
| JP | 2006-500536 | 1/2006 |
| JP | 2007-112180 | 5/2007 |
| JP | 2008-74291 | 4/2008 |
| JP | 2008-175496 | 7/2008 |

OTHER PUBLICATIONS

Japanese Office Action for Application No. 2010-013440, dated Nov. 22, 2011.
Japanese Office Action for Application No. 2010-013440, pp. 1-3, dated Mar. 6, 2012.
European Search Report for Application No. 11152083.9, dated Apr. 13, 2011.

* cited by examiner

*Primary Examiner* — Stephen Castellano
(74) *Attorney, Agent, or Firm* — Nelson Mullins Riley & Scarborough LLP; Anthony A. Laurentano

(57) ABSTRACT

There is provided a gas tank that suppresses an increase in pressure of a gas filled therein. A hydrogen tank comprises a tank main body filled with hydrogen, a thermofoamable heat-insulating layer provided on the external surface of the tank main body, a relief valve which is provided at the left end of the tank main body and which reduces the pressure in the tank main body by releasing the hydrogen in the tank main body, and a liner which extends from the relief valve toward the right end and which detects an increase in temperature. The relief valve is thermally connected to the liner, and is actuated based on heat transferred from the liner in order to release the hydrogen in the tank main body, thereby reducing the pressure in the tank main body.

10 Claims, 16 Drawing Sheets

NORMAL CONDITION
RELIEF VALVE: CLOSED

NORMAL CONDITION
RELIEF VALVE: CLOSED

NORMAL CONDITION
RELIEF VALVE: CLOSED

HIGH TEMPERATURE CONDITION
RELIEF VALVE: OPEN

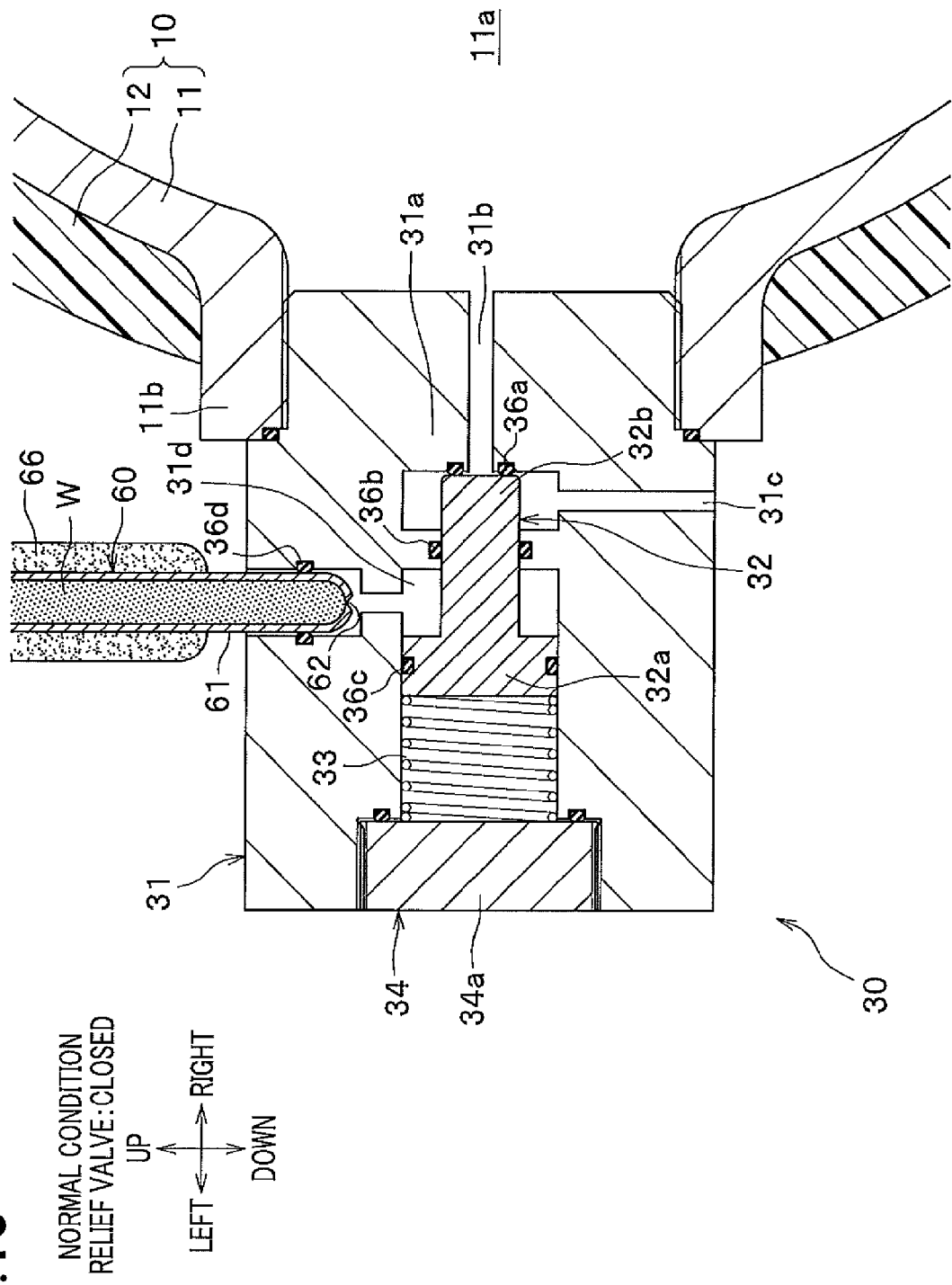

INSULATED GAS TANK WITH PRESSURE REDUCTION DEVICE

CROSS-REFERENCE TO RELATED APPLICATION

The present application claims benefit of priority under 35 USC 119 to Japanese Patent Application No. 2010-013440 filed on Jan. 25, 2010 the entire contents of which are hereby incorporated by reference.

FIELD OF THE INVENTION

The present invention relates to a gas tank.

DESCRIPTION OF THE RELATED ART

Recently, development of a fuel cell vehicle which is equipped with a fuel cell and which runs by its electrical power is progressed. Such a fuel cell vehicle is also equipped with, in addition to the fuel cell, a hydrogen tank (gas tank) that supplies hydrogen (a fuel gas) to the fuel cell, a compressor that supplies air, a coolant pump that circulates a coolant so as to flow through the fuel cell, a PDU (Power Drive Unit) that converts DC power to AC power, a motor for travelling, and a drive train that transmits the driving force generated by the motor to driving wheels.

External devices including the compressor, the coolant pump, the PDU, and the drive train generate heat when being actuated.

The hydrogen tank is filled with hydrogen at a high pressure, and a hydrogen supply path through which hydrogen supplied from the hydrogen tank to the fuel cell flows is provided with a plurality of pressure-reduction valves (regulators). A target pressure of hydrogen is set in accordance with electricity-generation requisite level calculated based on the open level of an accelerator or the like, and the pressure-reduction valves are controlled so that the secondary-side pressure of the pressure-reduction valves becomes the calculated target pressure.

It is a different case from hydrogen (a gas) filled in the hydrogen tank, but JP2001-130271A discloses a structure of a fuel tank which suppresses generation of a fuel vapor due to heat input into the fuel tank in which a liquid fuel (gasoline) is stored, thereby suppressing a negative effect to a fuel consumption or the like.

Meanwhile, in the case of fuel cell vehicle, when the vehicle travels under a high temperature condition like midsummer or when the external devices, a compressor, etc., generate heat as explained above so that heat is input into the hydrogen tank, hydrogen expands and the pressure in the hydrogen tank increases.

When the pressure of hydrogen in the hydrogen tank increases, the primary-side pressure of the above-explained pressure-reduction valves also increases, so that hydrogen is likely to be supplied to the fuel cell at a higher pressure than the target pressure. Such hydrogen supply at a high pressure often causes the fuel cell to poorly consume hydrogen and results in deterioration of the fuel cell.

Installation of a wide-range pressure-reduction valve with a wide control range can be considered in this case, but such a wide-range pressure-reduction valve is remarkably expensive, and thus becomes costly.

It is an object of the present invention to provide a gas tank that suppresses increase of a gas pressure filled in the interior thereof.

SUMMARY OF THE INVENTION

In order to achieve the above object, a first aspect of the present invention provides a gas tank comprising: a tank main body filled with a gas; a heat-insulating layer provided on an external surface of the tank main body; a pressure-reduction device which is provided at one end of the tank main body, and which reduces a pressure in the tank main body by releasing the gas from the tank main body; and a transferring component which extends from the pressure-reduction device toward the other end of the tank main body, and which transfers heat and pressure, in which the pressure-reduction device is actuated based on a detection operation by the transferring component, and releases the gas from the tank main body, thereby reducing the pressure in the tank main body.

According to such a gas tank, because the heat-insulating layer is provided on the external surface of the tank main body, heat from the external device (e.g., a compressor) arranged around the gas tank is blocked by the heat-insulating layer. Hence, the temperature of gas filled in the tank main body is unlikely to increase, and thus pressure thereof is unlikely to increase.

Also, even if heat from the external device is not completely blocked and some of such heat is transferred to the gas filled in the tank main body and the interior thereof, this heat is detected by the transferring component extending from one end of the tank main body to the other end thereof, and the transferring component outputs detection of heat, i.e., an increase in temperature, to the pressure-reduction device which is thermally connected to the transferring component.

The pressure-reduction device is actuated based on the detection operation by the transferring component, and releases the gas from the tank main body, thereby decreasing the pressure in the tank main body. Accordingly, the pressure of gas filled in the tank main body is unlikely to increase.

If heat transferred from the external device is blocked by the heat-insulating layer thus way, and if some of such heat is not blocked, i.e., some of such heat is transferred, the transferring component detects the heat, and the pressure-reduction device is actuated, so that the pressure in the tank main body is unlikely to increase.

Therefore, it is not necessary that the regulator for controlling the pressure of gas supplied from the gas tank is a wide range type, and a system (including the regulator) for receiving gas supply (i.e., a fuel cell system in the following embodiment) can be simplified and inexpensive.

Also, because the primary-side pressure of the regulator, etc., is unlikely to increase, gas can be supplied to an apparatus which needs the gas (i.e., a fuel cell in the following embodiment) after the pressure of gas is controlled appropriately by using the regulator.

A second aspect of the present invention provides the gas tank of the first aspect of the present invention, in which the heat-insulating layer is formed by applying a thermofoamable heat-insulating paint on the external surface of the tank main body, starts foaming when a temperature increases, and becomes the heat-insulating layer.

According to such a gas tank, the heat-insulating layer can be easily formed by applying the thermofoamable heat-insulating paint.

A third aspect of the present invention provides the gas tank of the first aspect of the present invention, in which the heat-insulating layer includes a heat-insulating member fixed on the external surface of the tank main body.

According to such a gas tank, the heat-insulating layer can be easily formed by fixing the heat-insulating member on the external surface of the tank main body.

A fourth aspect of the present invention provides the gas tank of any one of the first to third aspects of the present invention, in which the transferring component includes a part which constitutes the tank main body and which has a thermal conductivity, the pressure-reduction device is thermally connected to the transferring component, and heat is transferred from the transferring component to the pressure-reduction device.

According to such a gas tank, because the part (e.g., a liner in the following embodiment) configuring the tank main body has a thermal conductivity, heat input can be detected by the part itself. That is, the gas tank has no individual part as the transferring component, so that the number of parts of the gas tank can be reduced, and the structure of the gas tank can be simplified.

A fifth aspect of the present invention provides the gas tank of any one of the first to third aspects of the present invention, in which the transferring component includes a thermally expandable substance filled in the transferring component, and a pressure increasing together with a thermal expansion of the substance is transferred to the pressure-reduction device.

According to such a gas tank, when heat is transferred to the gas tank from the external device and the temperature of the tank main body increases, the temperature of the transferring component and that of the substance therein increase. This causes the substance filled in the transferring component to thermally expand, and the pressure inside the transferring component increases, thereby detecting the increase in temperature. That is, it is detected that any part of the tank main body is heated by heat from the external device.

The increase in temperature of the substance and the increase in pressure are transmitted as a pressure and output from the transferring component to the pressure-reduction device.

The pressure-reduction device is actuated upon detection of pressure (a pressure increased together with the increase in pressure inside the transferring component) input from the transferring component in order to release gas from the tank main body, thereby decreasing the pressure in the tank main body.

That is, even if the transferring component is locally heated, when the temperature of the substance thereinside increases, the substance thermally expands, and the pressure inside the transferring component also increases. Because a pressure is propagated more rapidly than a temperature, the pressure inside the transferring component encapsulating the substance uniformly and rapidly increases.

This causes the pressure transmission input into the pressure-reduction device from the transferring component to rapidly increase, and the pressure-reduction device releases gas from the tank main body by utilizing the increased pressure transmission, thereby decreasing the pressure in the tank main body.

A sixth aspect of the present invention provides the gas tank of the fifth aspect of the present invention, in which the substance thermally expands together with a phase-change when heated, and the pressure-reduction device obtains a thrust force for releasing the gas from the tank main body based on an increased pressure in the transferring component.

According to such a gas tank, the encapsulated substance thermally expands together with a phase-change when heated, and the pressure inside the transferring component increases. Correspondingly to this operation, pressure input into the pressure-reduction device from the transferring component also increases. The pressure-reduction device obtains a thrust force from the increasing pressure, and quickly releases the gas from the tank main body.

A seventh aspect of the present invention provides the gas tank of the fifth or sixth aspect of the present invention, in which the substance thermally expands when being boiled.

According to such a gas tank, when the encapsulated substance is boiled, the substance thermally expands, and the pressure inside the transferring component can rapidly increase.

An eighth aspect of the present invention provides the gas tank of any one of the fifth to seventh aspects of the present invention, in which the substance is a liquid at a normal temperature (25° C.).

According to such a gas tank, the transferring component can be easily constituted.

A ninth aspect of the present invention provides the gas tank of any one of the fifth to seventh aspects of the present invention, in which the substance is a solid at a normal temperature (25° C.).

Such a gas tank will hardly be affected by the posture of the transferring component.

A tenth aspect of the present invention provides the gas tank of any one of the fifth to ninth aspects of the present invention, in which the transferring component is formed in a tubular shape, and has one end connected to the pressure-reduction device, and the one end has an opening portion which is opened when an internal pressure of the transferring component becomes equal to or greater than a predetermined pressure, and which transfers a pressure by the substance to the pressure-reduction device.

According to such a gas tank, when the pressure inside the transferring component formed in a tubular shape becomes equal to or greater than a predetermined pressure, the opening portion is opened. Also, the pressure by the substance (the pressure inside the transferring component) is transmitted (input) from the one end of the transferring component to the pressure-reduction device.

An eleventh aspect of the present invention provides the gas tank of any one of the first to tenth aspects of the present invention, further comprising a meltable member which is provided in the pressure-reduction device, and which melts down when its temperature becomes equal to or greater than a predetermined temperature in order to cause the pressure-reduction device to release the gas from the tank main body, in which a low-sensitive treatment for lowering a sensitivity to heat is performed on a portion of the transferring component near the pressure-reduction device, and a high-sensitive treatment for improving the sensitivity to heat is performed on another portion of the transferring component apart from the pressure-reduction device.

According to such a gas tank, when the heat from the external device is transferred to a part apart from the pressure-reduction device, since a high-sensitive treatment for improving the sensitivity to heat is applied to the portion of the transferring component apart from the pressure-reduction device, the transferring component can rapidly detect heat generated at a distant location and transferred from the external device.

On the other hand, when the heat from the external device is input to a part near the pressure-reduction device, such heat is transferred to the meltable member provided in the pressure-reduction device, and such a meltable member melts down when its temperature becomes equal to or greater than a predetermined temperature, which causes the pressure-reduction device to release gas from the tank main body. That is, since a low-sensitivity treatment for lowering a sensitivity to heat is applied to the portion of the transferring component near the pressure-reduction device, a gas release based on whether or not the meltable member provided in the pressure-reduction device melts down takes precedence over the detection of heat by the transferring component.

A twelfth aspect of the present invention provides the gas tank of any one of the first to eleventh aspects of the present invention, in which the tank main body is installed in a vehicle, and the pressure-reduction device is arranged at a right or a left of the tank main body in a vehicle-width direction.

According to such a gas tank, because the pressure-reduction device is arranged at the right or left of the tank main body in the vehicle-width direction, so that when a vehicle is compressed in the vehicle-length direction by a collision, etc., the pressure-reduction device can be protected and the gas tank which suppresses increasing of a gas pressure can be maintained.

BRIEF DESCRIPTION OF THE DRAWINGS

FIG. 16 is a side cross-sectional view of the hydrogen tank according to the modified example, and shows a condition in which a relief valve is closed (a normal condition).

DETAILED DESCRIPTION OF THE PREFERRED EMBODIMENTS

First Embodiment

Figure 1:
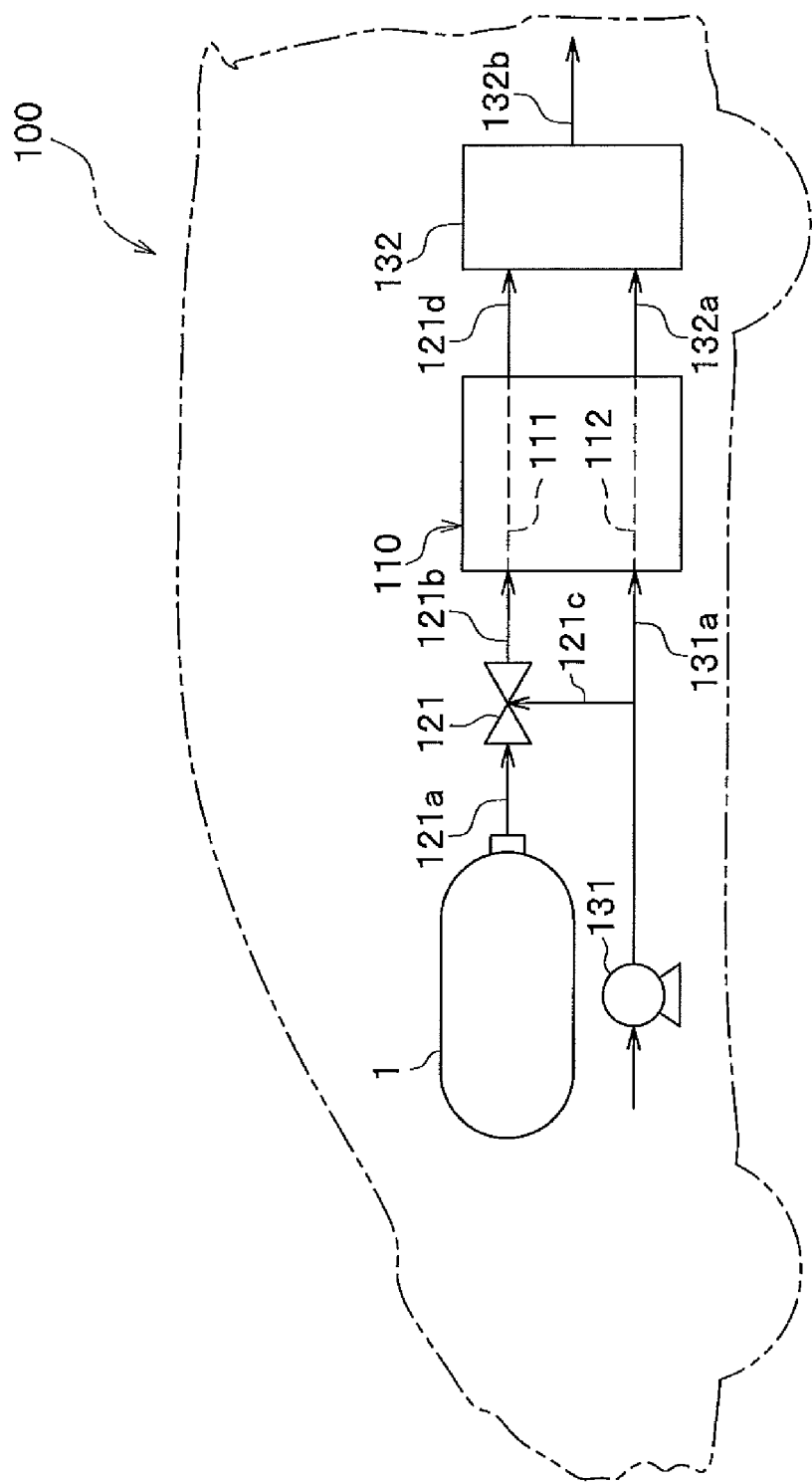
FIG. 1 is a side view showing a fuel cell vehicle according to a first embodiment of the present invention.

A first embodiment of the present invention will be explained with reference to FIGS. 1 to 6.

<<Configuration of Fuel Cell Vehicle>>

A fuel cell vehicle 100 (hereinafter, referred to as a travelling object) of this embodiment includes a fuel cell stack 110 (a fuel cell), a hydrogen tank 1 (a gas tank), a pressure-reduction valve 121, a compressor 131, and a dilution unit 132.

More specifically, the fuel cell vehicle 100 may be, for example, a four-wheel vehicle, a three-wheel cycle, a two-wheel vehicle, a unicycle, or a train.

The fuel cell stack 110 is a solid-polymer type fuel cell (Polymer Electrolyte Fuel Cell: PEFC), and has a plurality of stacked cells each including an MEA (Membrane Electrode Assembly) sandwiched between separators (not shown). The MEA has an electrolyte membrane (solid-polymer membrane), and a cathode and an anode sandwiching the MEA. Each separator is provided with an anode path 111 (a fuel gas path) and a cathode path 112 (an oxidant gas path) which are grooves or through-holes.

The hydrogen tank 1 is filled with hydrogen (a fuel gas) supplied to the anode path 111. The hydrogen tank 1 is connected to an inlet of the anode path 111 through a piping 121$a$, the pressure-reduction valve 121 (a regulator), and a piping 121$b$, so that hydrogen in the hydrogen tank 1 is supplied to the anode path 111 through the piping 121$a$, etc. . . .

That is, the piping 121$a$ and the piping 121$b$ constitute a hydrogen supply path (a fuel gas supply path) which is provided with the pressure-reduction valve 121. Also, the hydrogen supply path is provided with a normally closed shutoff valve that is controlled and opened/closed by an ECU (Electronic Control Unit, not shown). A plurality of pressure-reduction valves and shutoff valves, e.g., are provided in the following order toward the downstream, i.e., a primary shutoff valve, a primary pressure-reduction valve, a secondary shutoff valve, and a secondary pressure-reduction valve.

The pressure-reduction valve 121 is a primary pressure-reduction valve to reduce the pressure of hydrogen based on a pilot pressure input from a piping 121$c$ so that the pressure of hydrogen in the anode path 111 and the pressure of air in the cathode path 112 are balanced as disclosed in JP2004-185831A of this applicant. The upstream side of the piping 121$c$ is connected to a piping 131$a$ where air flows toward the cathode path 112.

An outlet of the anode path 111 is connected to the dilution unit 132 through a piping 121$d$. An anode-off gas exhausted from the anode path 111 is ejected to the dilution unit 132 through the piping 121$d$.

The compressor 131 is connected to an inlet of the cathode path 112 through a piping 131$a$, is actuated in accordance with an instruction given by the ECU, takes in air including oxygen, compresses the taken air, and pumps the compressed air to the cathode path 112. The compressor 131 is energized by the fuel cell stack 110, or a high-voltage battery (not shown), etc. . . .

The compressor 131 is a heat source that generates actuation heat when being actuated. In this embodiment, an example in which some of the actuation heat is transferred to the hydrogen tank 1 will be explained. That is, the compressor 131 is an external device generating heat from the standpoint of the hydrogen tank 1. The external device generating heat in this fashion includes various devices, such as the ECU, a coolant pump, the high-voltage battery, a PDU, and a drive train, and the compressor 131.

An outlet of the cathode path 112 is connected to the dilution unit 132 through a piping 132*a*. A cathode-off gas exhausted from the cathode path 112 is ejected to the dilution unit 132 through the piping 132*a*.

The piping 132*a* is provided with a normally opened back pressure valve (not shown) that has an open level controlled by the ECU. That is, the ECU calculates a required amount of power generation, a target air pressure, and a target hydrogen pressure based on the open level of an accelerator, and controls the open level of the back pressure valve and the revolution speed of the compressor 131 so as to obtain the target air pressure.

The dilution unit 132 dilutes hydrogen included in the anode-off gas from the piping 121*d* with the cathode-off gas from the piping 132*a*, thereby decreasing a hydrogen concentration, and has a dilution space in the dilution unit 132. The diluted gas is exhausted to the exterior of the vehicle through a piping 132*b*.

<<Structure of Hydrogen Tank>>

Next, a specific structure of the hydrogen tank 1 will be explained with reference to FIGS. 2 to 5.

As shown in FIGS. 2 to 5, the hydrogen tank 1 has a substantially cylindrical external shape, and is laterally provided relative to the fuel cell vehicle 100, and has the axial direction consistent with the vehicle width direction (right-and-left direction).

The hydrogen tank 1 includes a tank main body 10, a thermofoamable heat-insulating layer 21 formed around the external surface 13 of the tank main body 10 entirely, a relief valve 30 (pressure-reduction device) provided at the left-end side (the one end side) of the tank main body 10, and a metal body 40 (a meltable member) built in the relief valve 30. The hydrogen tank 1 is fixed to the frame (the vehicle body) of the fuel cell vehicle 100 by means of, for example, a metal belt (not shown).

<Tank Main Body>

Figure 2:
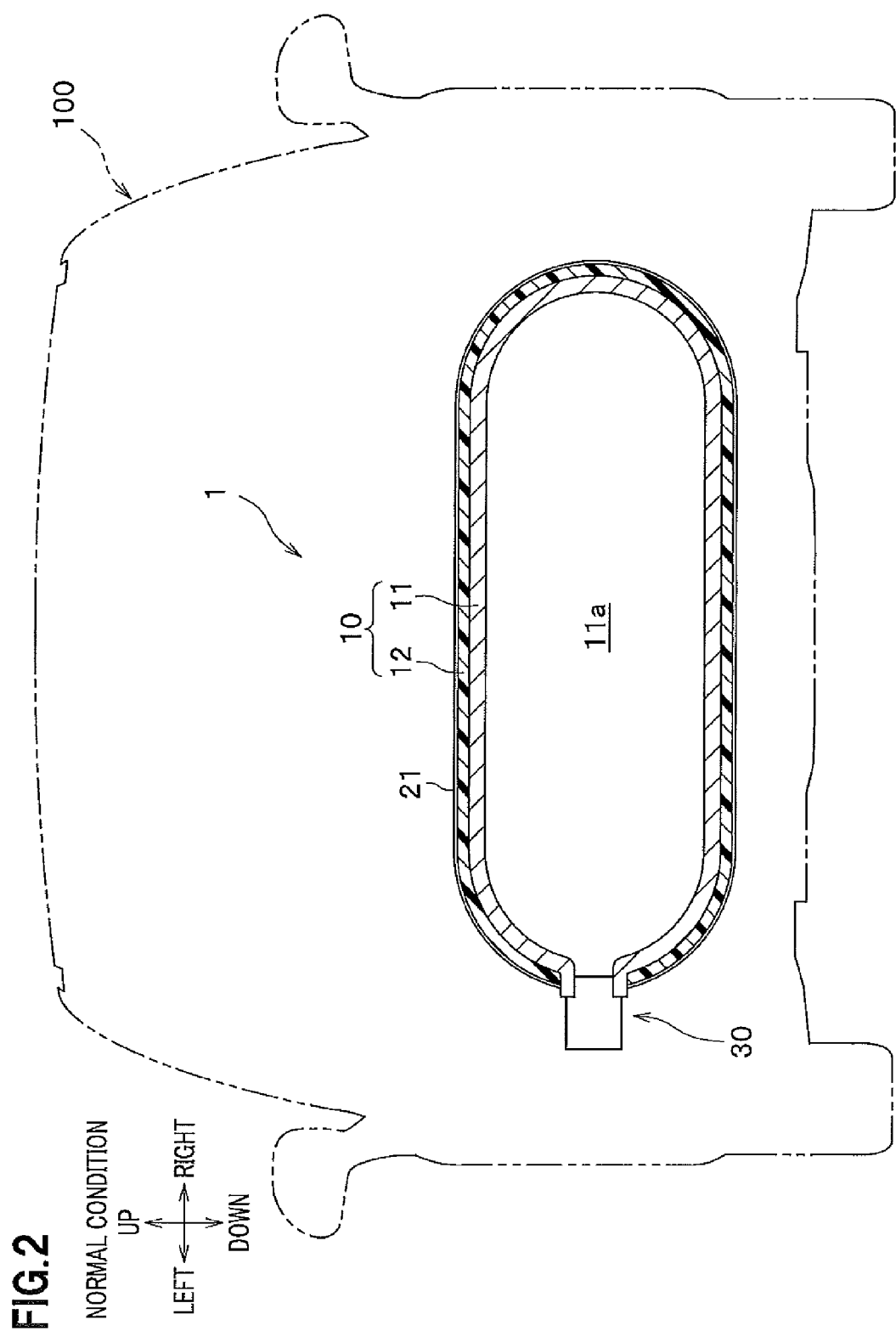
FIG. 2 is a side cross-sectional view of a hydrogen tank according to the first embodiment, and shows a normal condition.
Figure 3:
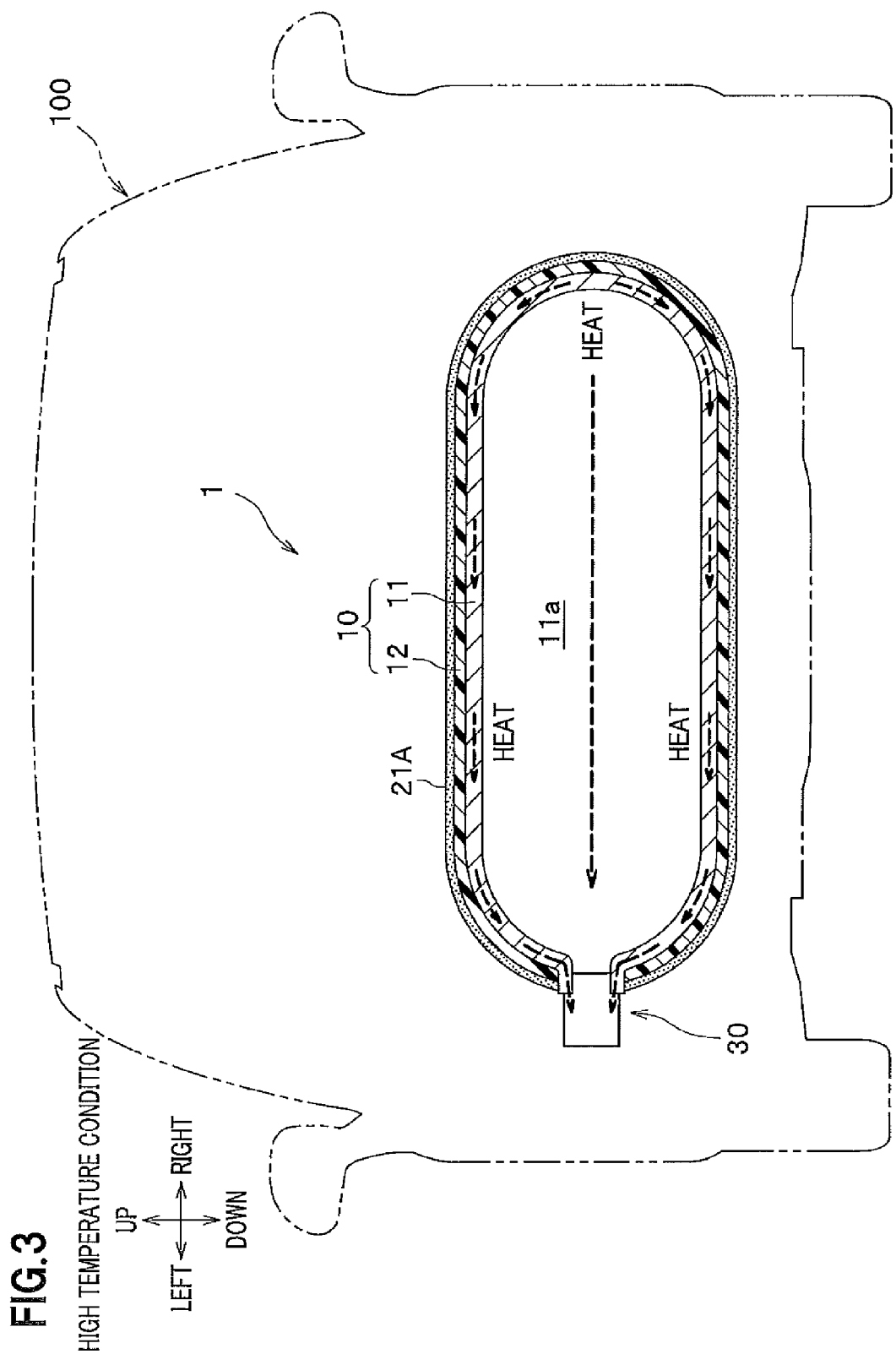
FIG. 3 is a side cross-sectional view of the hydrogen tank according to the first embodiment, and shows a high temperature condition (a condition in which heat is input)
Figure 4:
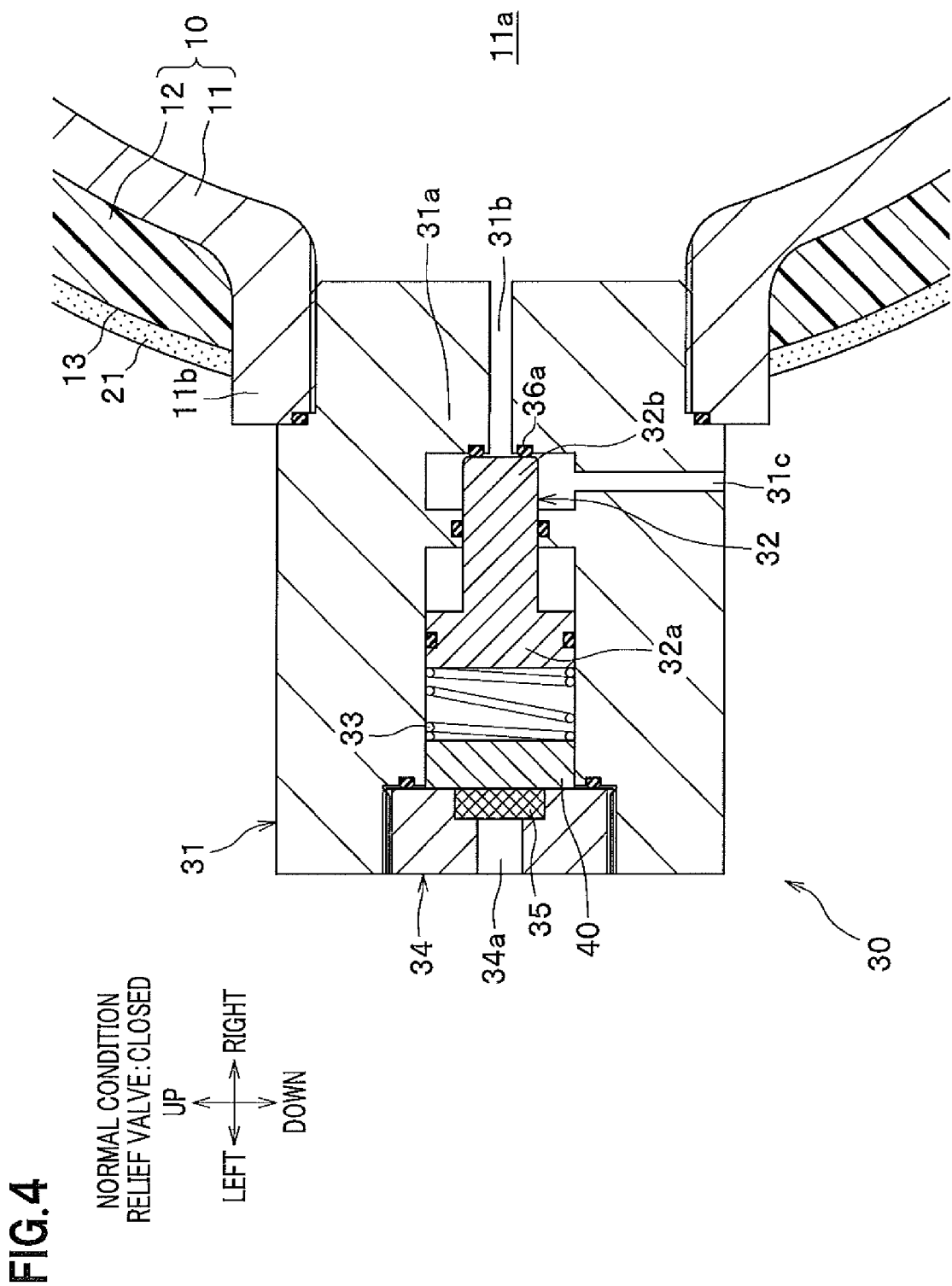
FIG. 4 is a side cross-sectional view of the major part of the hydrogen tank according to the first embodiment, and shows a condition (a normal condition) in which a relief valve is closed.

The tank main body 10 has a substantially cylindrical external shape, and as shown in FIGS. 2 and 3, is made of a liner 11 and a CFRP (Carbon Fiber Reinforced Plastic), etc., and also has a reinforcement layer 12 covering the outer circumference surface of the liner 11, so that the tank main body 10 has a double-layer structure.

The liner 11 extends from the relief valve 30 provided at the left-end side (the one end side) of the tank main body 10 to the right-end side (the other-end side) of the tank main body 10.

Moreover, the liner 11 is formed of an aluminum alloy, etc., and has a thermal conductivity. Accordingly, the liner 11 functions as transferring component for detecting the increase in temperature of the hydrogen tank 1, and detection of such increase in temperature is made through transmission of heat across the liner 11. That is, since the hydrogen tank 1 detects heat input through the liner 11 itself that is the framework of the hydrogen tank 1, and since the hydrogen tank 1 has no additional part as the transferring component, the number of parts can be reduced, thereby accomplishing a simple and lightweight structure.

However, the material of the liner 11 is not limited to an aluminum alloy, and may be, for example, a copper alloy, or a resin (a resin containing dispersed metal chips) having an enhanced thermal conductivity.

The interior of the liner 11 serves as a tank room 11*a* where hydrogen is filled and stored. The liner 11 has a neck part 11*b* to which a valve body 31 of the relief valve 30 is screwed to the left portion of the liner 11.

The reinforcing layer 12 is obtained by, for example, winding up a long carbon fiber impregnated with a thermosetting resin in a predetermined manner, and by causing the thermosetting resin to be cured.

The specific structure of the tank main body 10 is not limited to such a double-layer structure of those liner 11 and reinforcing layer 12. For example, the specific structure of the tank main body 10 may be a monolayer structure of only a liner formed of a synthetic resin or a metal.

<Thermofoamable Heat-Insulating Layer>

Figure 5:
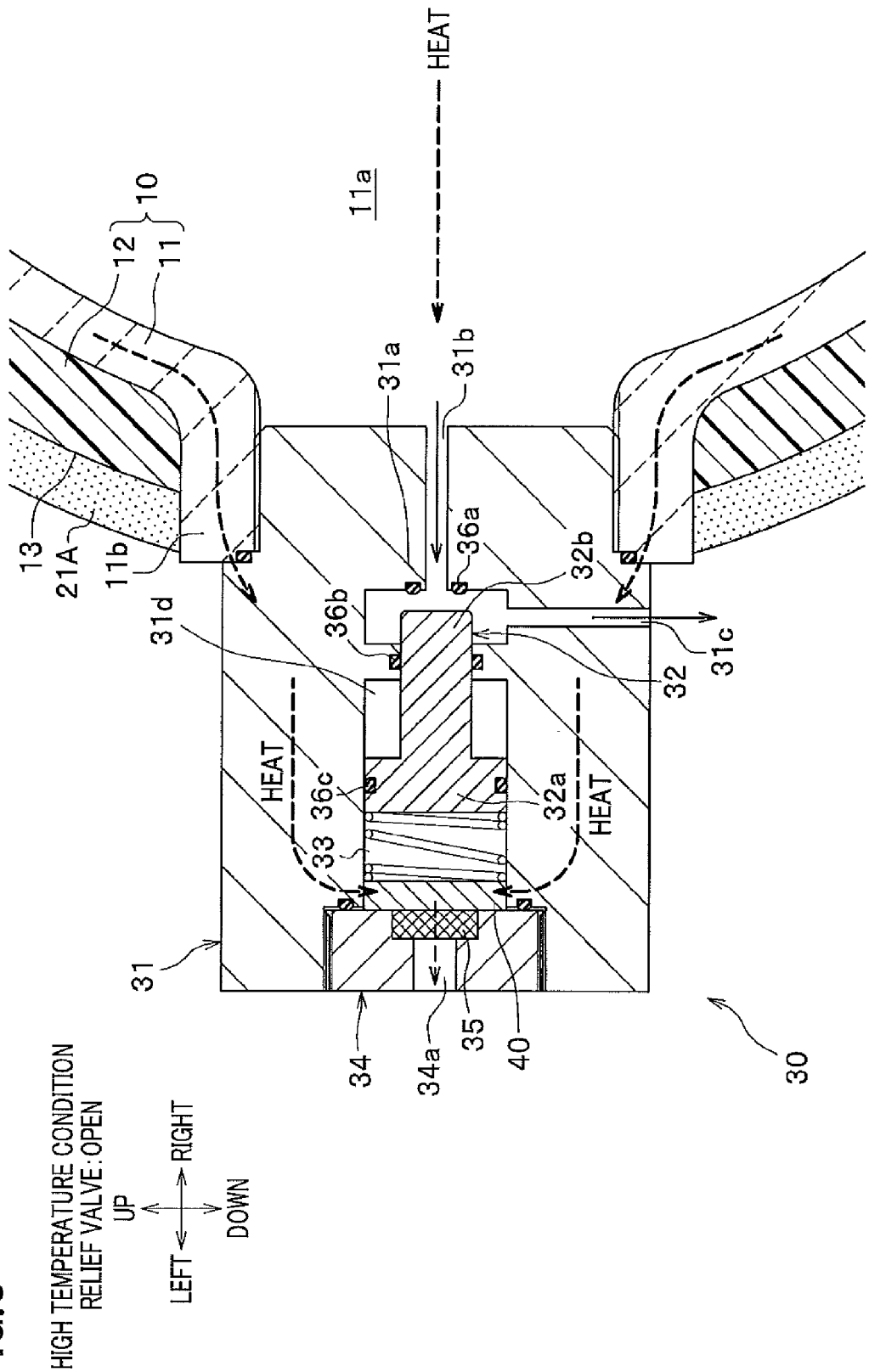
FIG. 5 is a side cross-sectional view of the major part of the hydrogen tank according to the first embodiment, and shows a condition (a high temperature condition) in which the relief valve is opened.

The thermofoamable heat-insulating layer 21 is a layer containing a constituent that is a foaming agent like poly-ammonium-phosphate, and when heated from the exterior, the temperature of such a layer increases, and when reaching a foaming temperature, such a layer generates a gas and foams, thereby forming a heat-insulating layer 21A (a foam layer) having a large number of foams formed in the interior thereof (see FIG. 5). Such thermofoamable heat-insulating layer 21 can be easily formed by, for example, applying a conventionally well-known thermofoamable heat-insulating paint containing a constituent that is a foaming agent like poly-ammonium-phosphate on the whole external surface 13 of the tank main body 10 (the reinforcing layer 12).

The foaming temperature at which the thermofoamable heat-insulating layer 21 foams can be set and changed appropriately by changing the foaming agent that generates a gas when its temperature increases. That is, the foaming temperature of the thermofoamable heat-insulating layer 21 is set, and its design is changed appropriately in accordance with the temperature of the external device such as the compressor 131 that generates heat.

Moreover, the thermofoamable heat-insulating layer 21 is not limited to a monolayer structure, and may employ a multilayer structure having layers each of which has different foaming temperature. Furthermore, an undercoat may be formed between the thermofoamable heat-insulating layer 21 and the tank main body 10, and a topcoat may be formed on the thermofoamable heat-insulating layer 21.

<Relief Valve and Metal Body>

The relief valve 30 is a normally closed valve provided at the left of the tank main body 10, and when it opens, hydrogen in the tank main body 10 is released to the exterior, thereby reducing the pressure in the interior of the tank main body 10. Accordingly, when the fuel cell vehicle 100 is compressed in the vehicle-length direction by collision, the relief valve 30 is not compressed and can be protected from such collision.

The relief valve 30 includes the valve body 31 screwed to the neck 11*b*, a valve element 32 (a piston) that moves back and forth in the valve body 31, a compression coil spring 33 that urges the valve element 32 toward the closed direction (the right), and a cap 34 that maintains the compression coil spring 33 to be loaded in the valve body 31. The valve body 31 and the neck 11*b* (the liner 11) are thermally coupled together.

The valve body 31 is provided with a normally closed shutoff valve (an in-tank solenoid valve) (not shown) which is controlled to open/close by the ECU, and which is controlled to open when hydrogen is supplied to the fuel cell stack 110.

The valve body 31 has a valve seat 31*a* which the valve element 32 touches when the valve is closed, and has a first port 31*b* and a second port 31*c* which are formed in the interior of the valve body 31 and which serve as a path of releasing hydrogen when the valve is opened. The valve seat 31a is provided with an O-ring 36a for improving the sealing capability when the valve is closed.

The valve element 32 has a large-diameter part 32a integrally formed at the left (one end side) thereof, and a small-diameter part 32b extending from the large-diameter part 32a to the right (the other-end side). The small-diameter part 32b touches the valve seat 31a (the O-ring 36a) of the valve body 31 in a normal condition (when the valve is closed) in order to plug off the first port 31b and the second port 31c, thereby closing the relief valve 30. A normal condition means a condition in which the interior of the tank main body 10 is at a pressure equal to or less than a rated pressure, and the above-explained metal body 40 is not melted yet.

The above-explained metal body 40 is provided between the compression coil spring 33 and the cap 34, and is formed of a low-melting-point metal (e.g., a tin or indium alloy), that melts down when the temperature thereof increases equal to or greater than a predetermined temperature.

When the temperature becomes high in the vicinity of the relief valve 30 due to heat from the compressor 131 or the like, this heat is propagated to the metal body 40 through a heat propagating path 34a formed by the cap 34. When the metal body 40 melts down, the melted portion flows out to the exterior through the heat propagating path 34a, so that a space is formed where the metal body 40 was originally present.

Also, the metal body 40 is heated by heat transferred from the liner 11 and the valve body 31 (see FIG. 3), and melts down (see FIG. 5).

When such a space is formed in this fashion, the valve element 32 slides to the left by means of high-pressure hydrogen in the tank main body 10, i.e., the valve element 32 is moved apart from the valve seat 31a, and at the same time, the first port 31b and the second port 31c are communicated with each other, so that hydrogen in the tank main body 10 is released to the exterior through the first and second ports 31b, 31c, thereby reducing the pressure in the tank main body 10.

The heat propagating path 34a of the cap 34 is provided with a filter 35, and external heat can be propagated to the metal body 40 through the filter 35, and the melted piece of the metal body 40 can flow out to the exterior through the filter 35. Such a filter 35 can be formed of a foam metal or a porous metal obtained by sintering.

<<Operation and Effect of Hydrogen Tank>>

Operation and effect obtained by the hydrogen tank 1 is are follows.

When the temperature of the thermofoamable heat-insulating layer 21 increases and reaches a predetermined foaming temperature due to heat transferred from the compressor 131, the thermofoamable heat-insulating layer 21 starts foaming, and becomes the heat-insulating layer 21A (see FIG. 5). Accordingly, heat transferred from the compressor 131 is blocked by the heat-insulating layer 21A. Therefore, the temperature of hydrogen filled in the tank main body 10 hardly increases, and the pressure of hydrogen hardly increases.

Also, if heat transferred from the compressor 131 is not completely blocked by the heat-insulating layer 21A, and if some of such heat is transferred to the tank main body 10, the heat is detected by the liner 11 having a thermal conductivity, and is propagated to the relief vale 30, thereby heating the metal body 40 (see FIGS. 3 and 5). Some of heat is transferred to the relief valve 30 through the filled hydrogen as a conduction medium.

Figure 6:
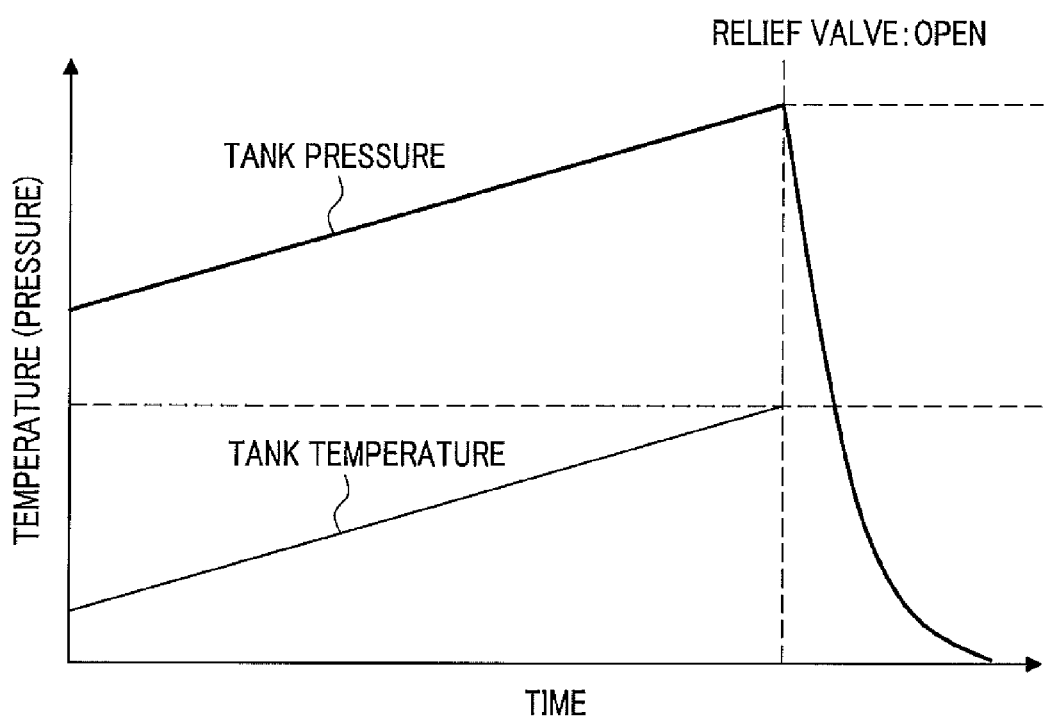
FIG. 6 is a graph showing an effect of the hydrogen tank according to the first embodiment.

When the temperature of the metal body 40 increases and the metal body 40 starts melting, the relief valve 30 opens, hydrogen in the tank main body 10 is released to the exterior, and the pressure in the hydrogen tank 1 decreases (see FIG. 6).

Accordingly, since the pressure of hydrogen in the hydrogen tank 1 is unlikely to increase, the actuation heat generated by the compressor 131 does not increase the primary-side pressure of the pressure-reduction valve 121 shown in FIG. 1.

Therefore, it becomes unnecessary to provide a wide-range pressure-reduction valve 121 having a wide control range, enabling production of the fuel cell vehicle 100 at a low cost. Also, the pressure-reduction valve 121 can adjust and reduce the pressure of hydrogen appropriately, and the hydrogen is supplied to the anode path 111 at an appropriate pressure, thereby preventing the fuel cell stack 110 from being deteriorated by hydrogen supplied at an unexpected high pressure. It is possible to reduce the opportunity that hydrogen directly goes through the fuel cell stack 110, and the fuel consumption of the fuel cell stack 110, i.e., the consumption efficiency of hydrogen improves.

The first embodiment of the present invention was explained above, but the present invention is not limited to the first embodiment, and can be combined with other embodiments to be discussed later or can be changed and modified as follows.

Although an example in which the hydrogen tank 1 is installed in a travelling object was explained in the foregoing first embodiment, the hydrogen tank 1 may be a stationary hydrogen tank 1.

Although an example configuration in which the gas tank is the hydrogen tank that supplies hydrogen to the fuel cell stack 110 was explained in the foregoing first embodiment, the gas tank may be a natural gas tank which supplies a natural gas to a CNG (Compressed Natural Gas) engine.

Although an example configuration in which the tank main body 10 is filled with combustible hydrogen was explained in the foregoing first embodiment, the present invention is not limited to combustible gas, and the tank main body 10 may be filled with, for example, oxygen, nitrogen, argon, etc. . . .

Second Embodiment

Figure 7:
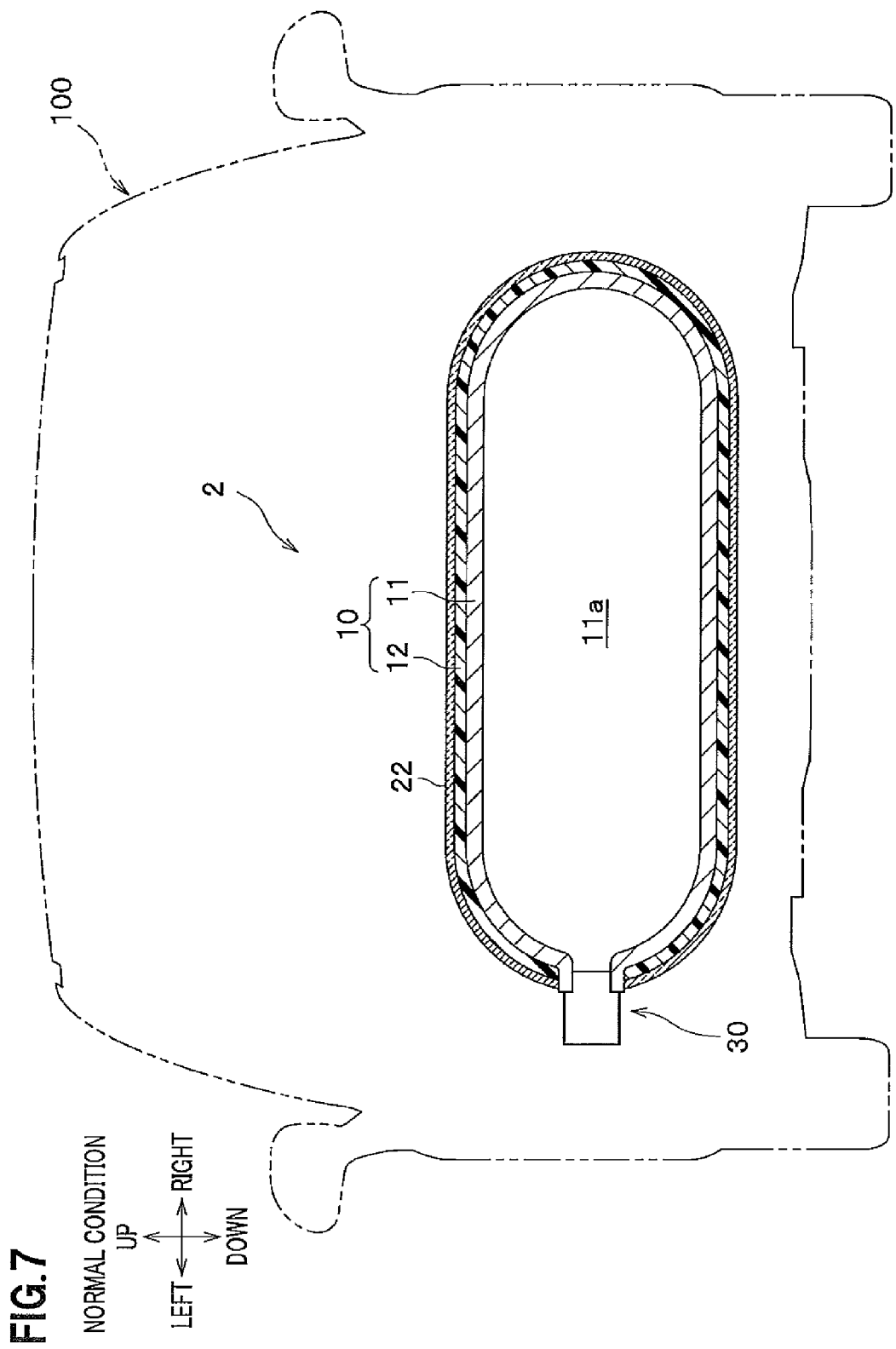
FIG. 7 is a side cross-sectional view of a hydrogen tank according to a second embodiment.

Next, a second embodiment of the present invention will be explained with reference to FIG. 7. The only differences from the first embodiment will be given.

A hydrogen tank 2 of the second embodiment has, instead of the thermofoamable heat-insulating layer 21, a heat-insulating member 22 (a cover) which is fixed on the external surface 13 of the tank main body 10, and which initially has heat-insulating properties so as to serve a heat-insulating layer as it is. That is, it is unnecessary to apply a thermofoamable heat-insulating paint in order to form the thermofoamable heat-insulating layer 21, thus the hydrogen tank 2 can be simplified. Also, because the heat-insulating member 22 has a predetermined thickness, the hydrogen tank 2 hardly be deformed.

The heat-insulating member 22 comprises two vertically separated pieces, i.e., an upper half and a lower half, and is bonded, and fixed by using a bond or fastened and fixed by using a bolt, etc. . . . Also, the heat-insulating member 22 may be provided with a hook, and may be attached to the tank main body 10 by snap fitting through such a hook.

Third Embodiment

Figure 8:
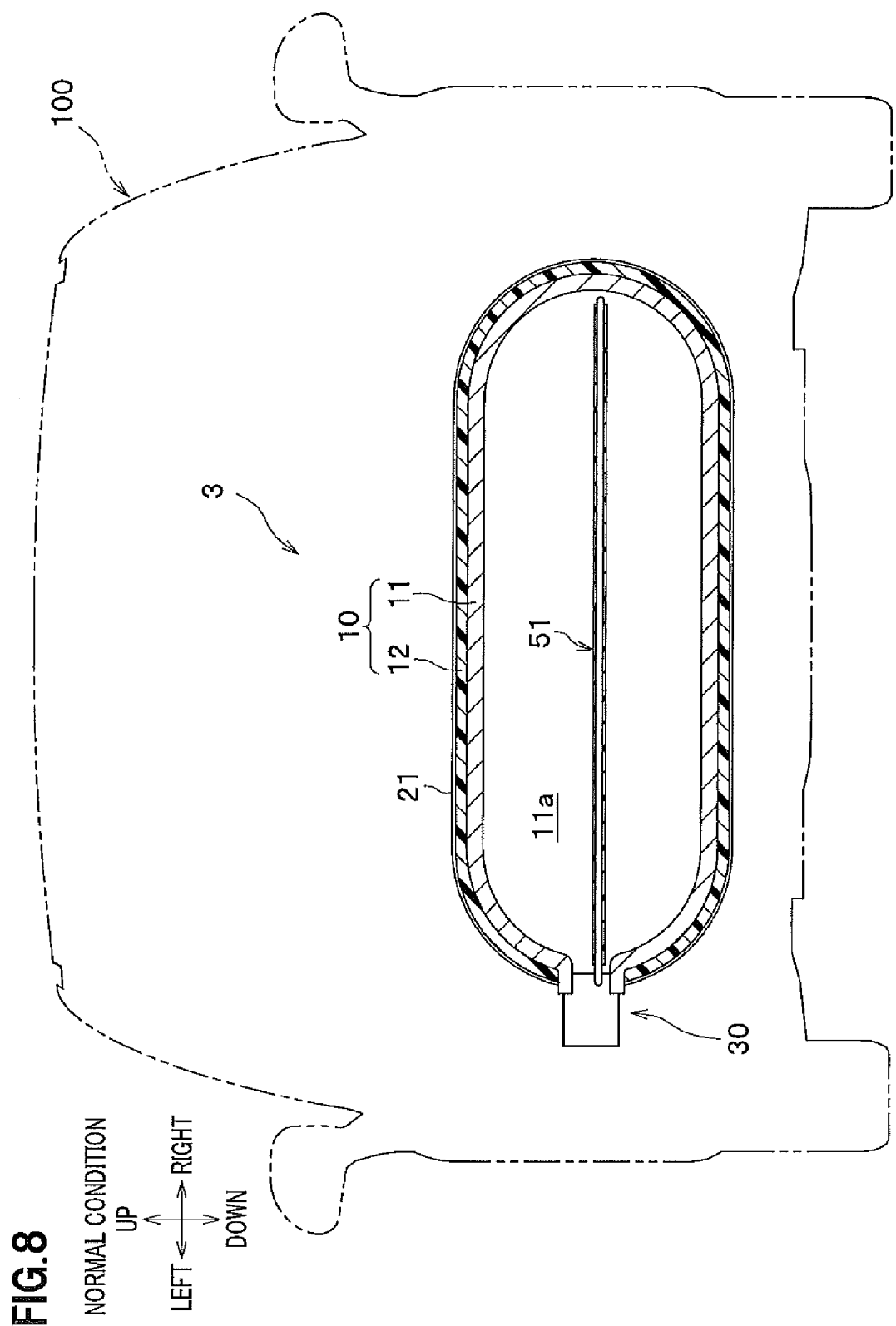
FIG. 8 is a side cross-sectional view of a hydrogen tank according to a third embodiment.

Next, a third embodiment of the present invention will be explained with reference to FIGS. 8 to 10. The only differences from the first embodiment will be given.

A hydrogen tank 3 of the third embodiment has, in addition to the configuration of the hydrogen tank 1 of the first embodiment, a bar-shaped heat pipe 51 (transferring component) arranged in the tank room 11a.

Figure 9:
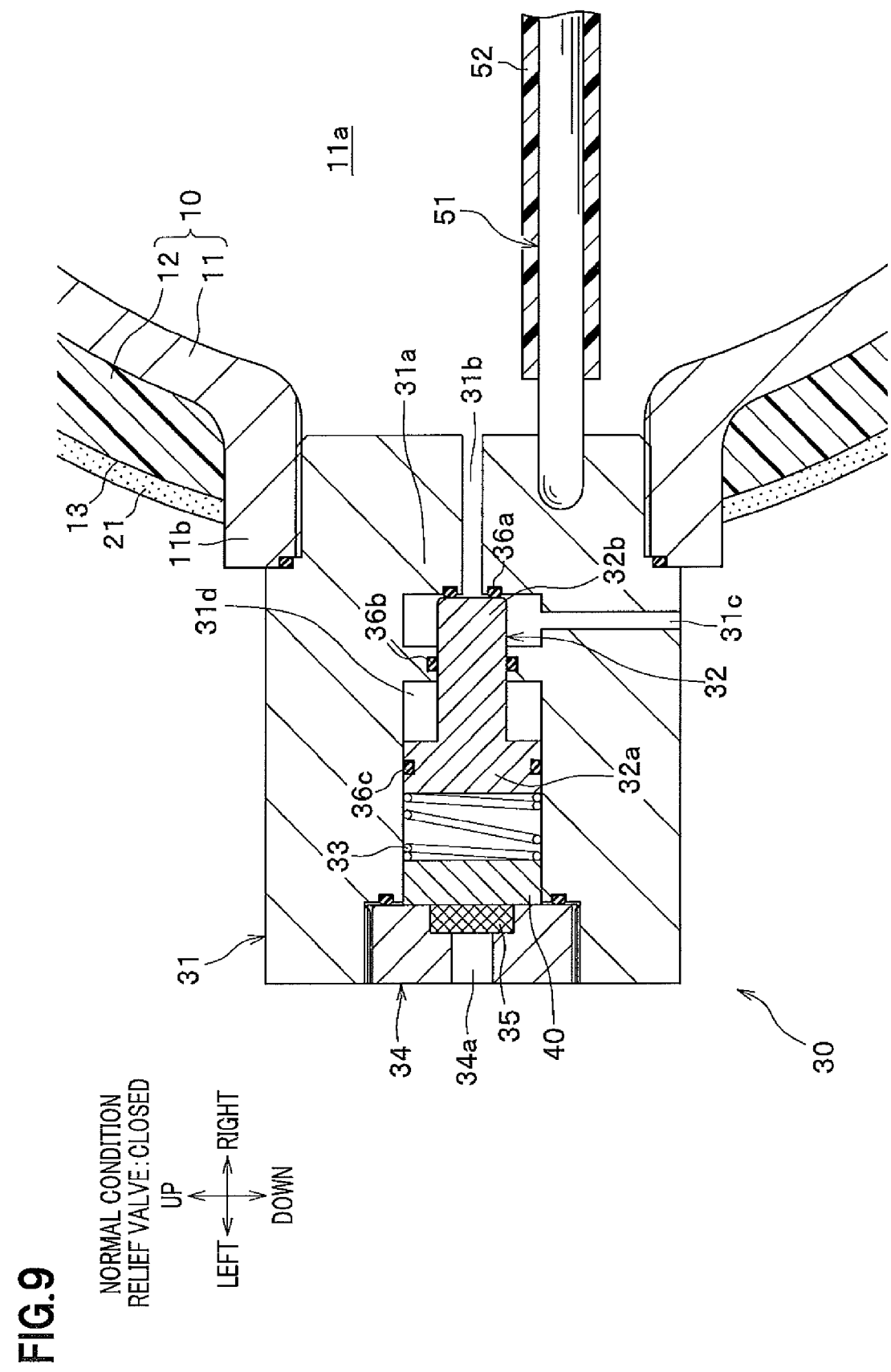
FIG. 9 is a side cross-sectional view of the hydrogen tank according to the third embodiment, and is an enlarged view of the left portion (the one end side) of the hydrogen tank.

The left end of the heat pipe 51 is screwed to and fixed to the valve body 31 (see FIG. 9). That is, the heat pipe 51 is thermally coupled to the relief valve 30.

Figure 10:
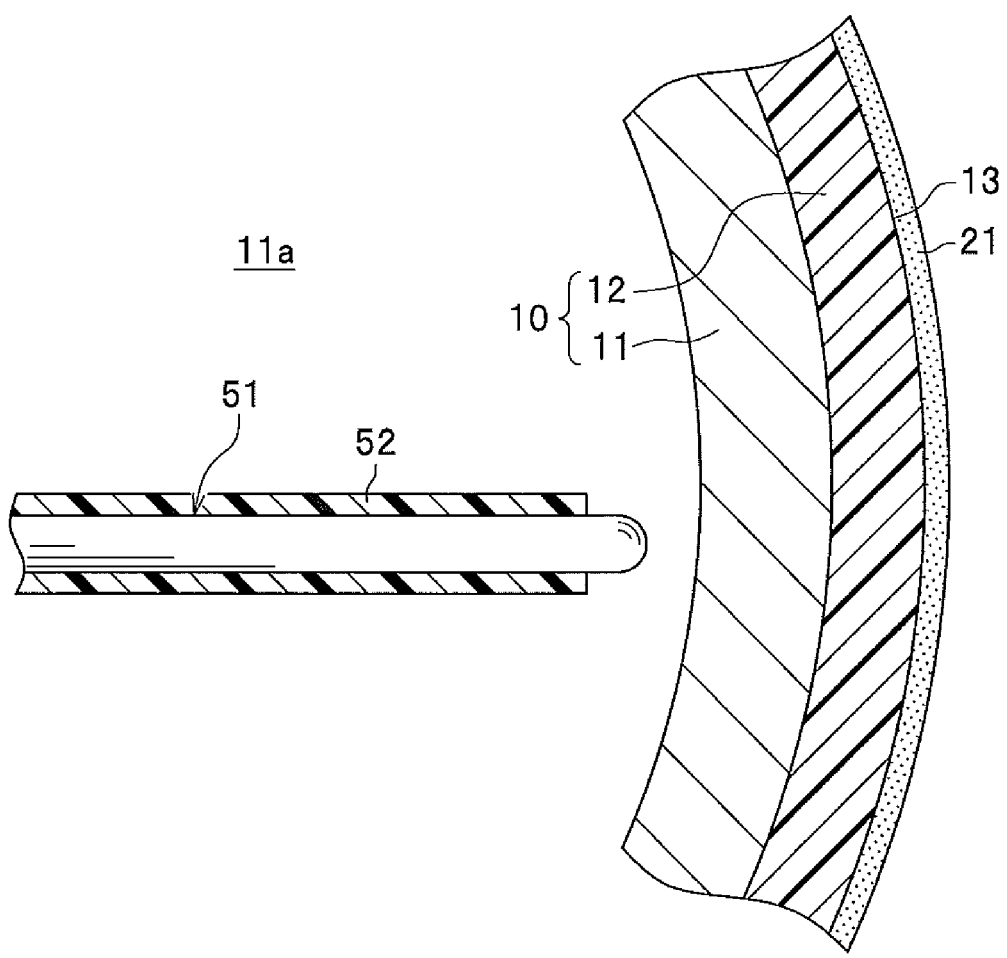
FIG. 10 is a side cross-sectional view of the hydrogen tank according to the third embodiment, and is an enlarged view of the right portion (the other-end side) of the hydrogen tank.

The heat pipe 51 extends from the relief valve 30 provided at the left end of the tank main body 10 toward the right end of the tank main body 10 in the tank room 11a (see FIG. 10). Also, a heat-insulating member 52 is provided on the surface of the heat pipe 51 other than the left end and the right end.

Accordingly, when heat is input from the right side of the hydrogen tank 3 into the tank room 11a, the heat is detected at the right end of the heat pipe 51. Next, the detected heat is transferred through the heat pipe 51 to the relief valve 30, and the metal body 40 of the relief valve 30 is thus heated.

In this case, because the heat-insulating member 52 is provided on the surface of the heat pipe 51, heat transferred by the heat pipe 51 is unlikely to be dissipated to hydrogen filled in the tank room 11a through the halfway of the heat pipe 51, but is rapidly transferred to the relief valve 30. Accordingly, the relief valve 30 can be actuated without a delay.

Fourth Embodiment

Next, a fourth embodiment of the present invention will be explained with reference to FIGS. 11 to 14. The only differences from the first embodiment will be given.

<Structure of Hydrogen Tank>

A hydrogen tank 4 of the fourth embodiment has, in addition to the configuration of the hydrogen tank 1 of the first embodiment, a tubular thermosensitive tube 60 (transferring component) having water W (material) filled in the interior thereof.

Figure 12:
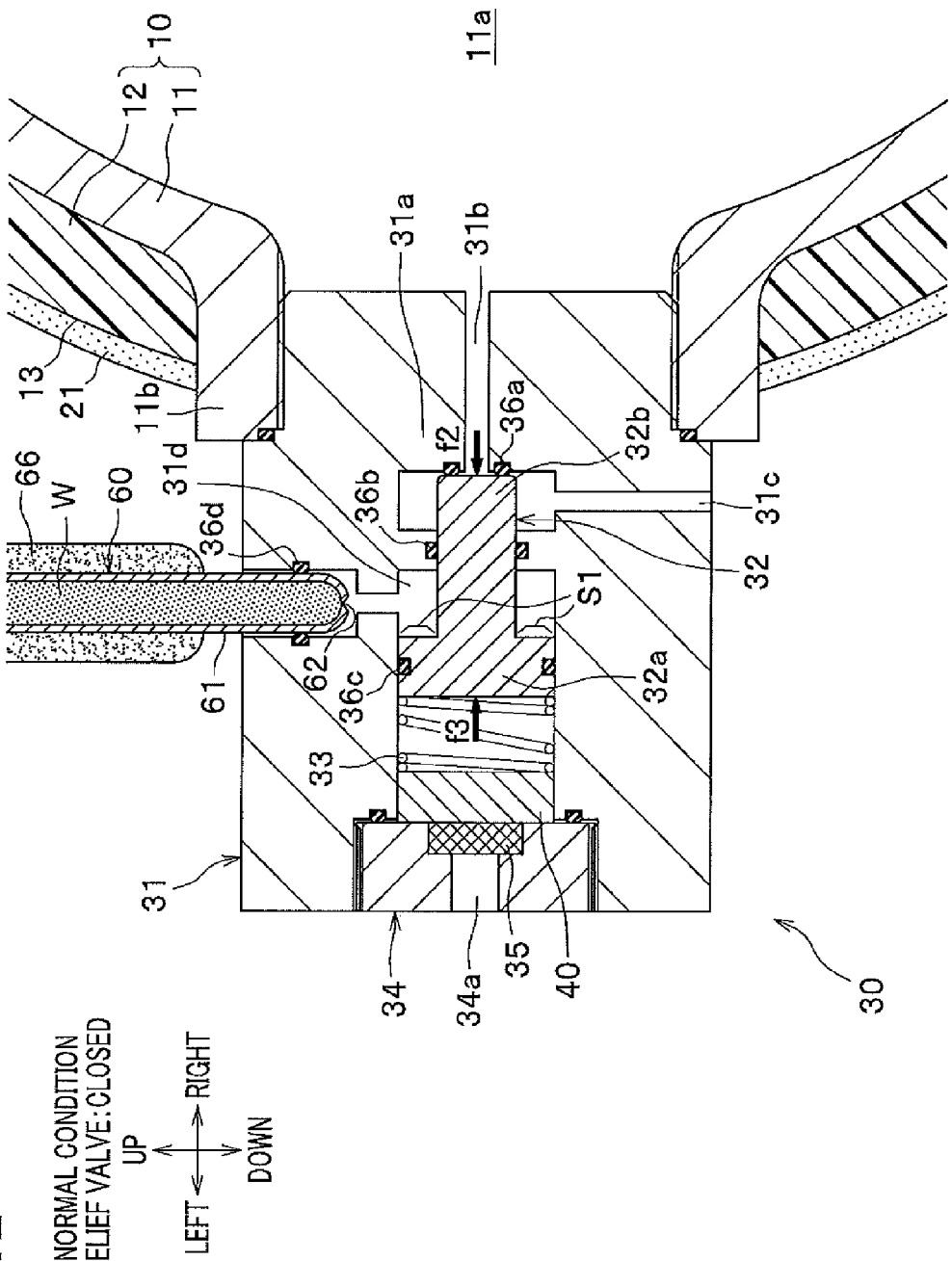
FIG. 12 is a side cross-sectional view of the left portion of the hydrogen tank according to the fourth embodiment, and shows a condition (a normal condition) in which a relief valve is closed.
Figure 13:
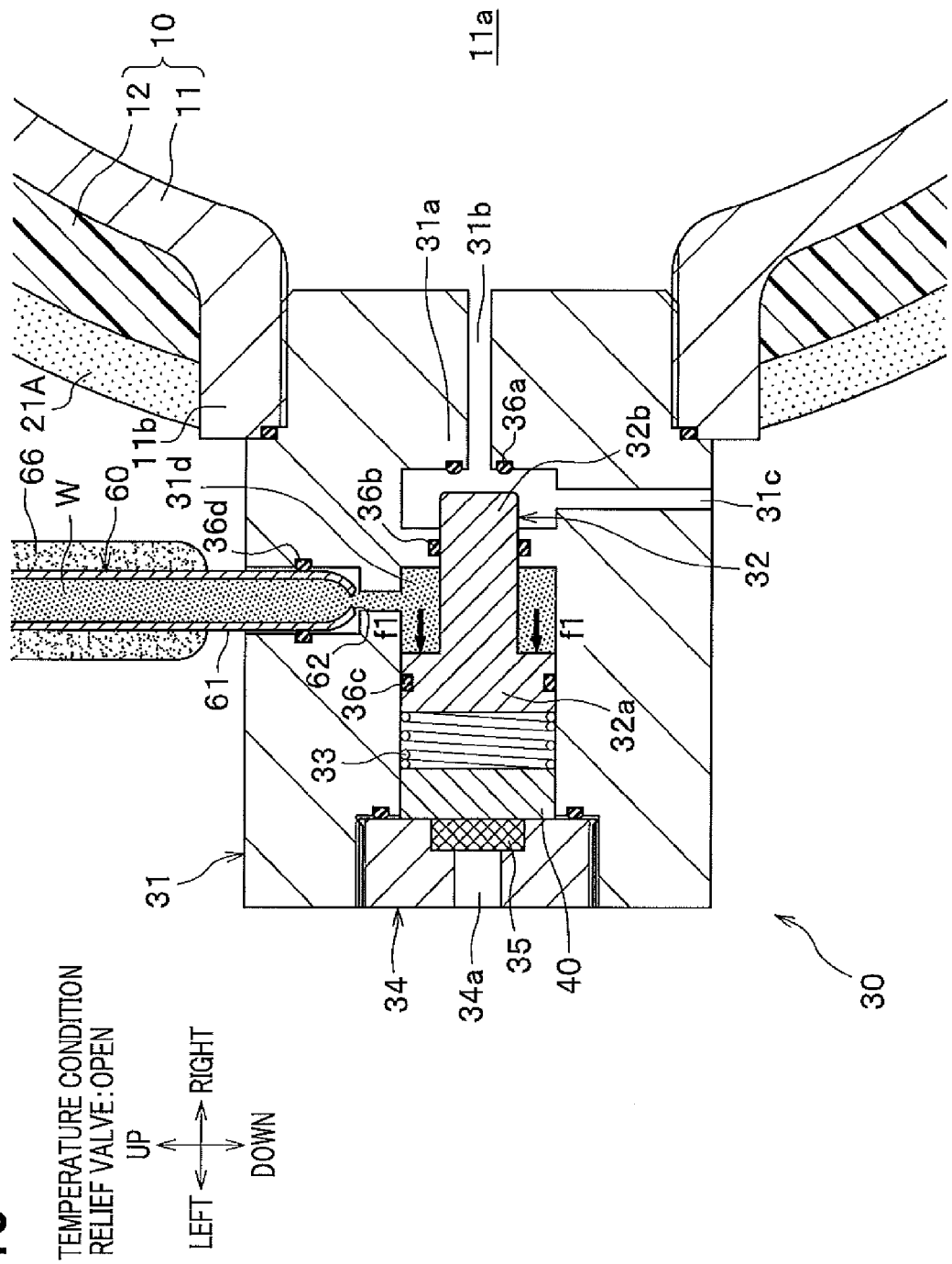
FIG. 13 is a side cross-sectional view of the left portion of the hydrogen tank according to the fourth embodiment, and shows a condition (a high temperature condition) in which the relief value is opened.

As shown in FIGS. 12, 13, a vapor room 31d where the water W (vapor and liquid, hereinafter referred to as vapor, etc.,) flows from the thermosensitive tube 60 is formed in the interior of the valve body 31.

When vapor, etc., flows in the vapor room 31d, the vapor, etc., pushes the large-diameter part 32a of the valve element 32 to the left, so that the valve element 32 slides to the left and is moved apart from the valve seat 31a. Accordingly, the first and second ports 31b, 31c are communicated with each other, the relief valve 30 is opened, and hydrogen in the tank main body 10 is released to the exterior through the first and second ports 31b, 31c, thereby reducing the pressure in the tank main body 10.

That is, the relief valve 30 obtains pressing force (thrust force) that pushes the valve element 32 to the left (the direction in which the relief valve 30 opens) in order to release hydrogen based on the pressure by vapor, etc., entering into the vapor room 31d.

In order to prevent vapor, etc., flowing into the vapor room 31d from leaking to the exterior or from mixing with hydrogen to be released, an O-ring 36b, an O-ring 36c are attached between the large-diameter part 32a, the small-diameter part 32b, and the valve body 31.

The thermosensitive tube 60 detects a temperature of the tank main body 10 and that in the vicinity of the tank main body 10, converts the detected temperature to a transmission of pressure, and outputs such a transmission to the relief valve 30. The thermosensitive tube 60 is wound up around the tank main body 10 approximately one round and a half in the vehicle width direction (see FIG. 11). That is, the thermo sensitive tube 60 is provided around the tank main body 10 so as to run along the outer circumference surface of the tank main body 10, and detects heat at (any one of) the non-wound portions of the tank main body 10 and those in the vicinity thereof.

Such a thermosensitive tube 60 is made of a tubular metal having anticorrosion properties like a stainless steel alloy, and has a simple structure in which the water W (the material) is enclosed therein and which is easily produced. That is, the interior of the thermosensitive tube 60 is filled with the water W.

The water W is a liquid at a normal temperature (25° C.) and at a normal pressure (1 atm). When the water W is boiled and vaporized by the increase in temperature, the water W greatly increases its volume by thermal expansion. Therefore, the pressure in the thermosensitive tube 60 rapidly increases. The water W is not resolved at a target valve-opening temperature at which the relief valve 30 should be opened according to the present embodiment.

That is, when the thermosensitive tube 60 and the tank main body 10 are partially heated by heat transferred from the compressor 131, the filled water W (the liquid) is subjected to increase in temperature, is boiled, and is subjected to phase-change to vapor (a gas), thereby increasing its volume (thermal expansion). Accordingly, the pressure in the thermosensitive tube 60 uniformly increases, and is rapidly propagated to a portion where a notch 62 to be discussed later is formed. In contrast, since the temperature is less easily propagated than the pressure, a temperature difference is likely to occur.

One end 61 of the thermosensitive tube 60 is connected to the vapor room 31d formed in the valve body 31 of the relief valve 30. That is, the thermosensitive tube 60 is thermally connected to the relief valve 30. Note that an O-ring 36d is provided between the one end 61 of the thermosensitive tube 60 and the valve body 31 in order to prevent leakage of vapor, etc. . . .

Also, the notch 62 (a notched portion to be an opening portion) which breaks off when the thermosensitive tube 60 is heated, the water W is boiled, and the pressure in the thermosensitive tube 60 becomes equal to or greater than a predetermined pressure is formed as the one end 61 of the thermosensitive tube 60. The thickness of the thermosensitive tube 60 becomes thin at the notch 62. That is, the notch 62 is an example of the releasing portion which performs an open operation when the pressure in the thermosensitive tube 60 becomes equal to or greater than the predetermined pressure, and which transmits the pressure of the water W (the material) to the relief valve 30 (pressure-reduction device).

The opening portion is not limited to the a notch 62. For example, the opening portion may employ a structure that an opening formed in the thermo sensitive tube 60 is plugged off by a small plug, and when the pressure in the thermosensitive tube 60 becomes equal to or greater than the predetermined pressure, the plug is removed from the opening and the opening portion is opened. Moreover, the thermosensitive tube 60 may employ a structure that the opening portion itself is a small relief valve.

When the pressure in the thermosensitive tube 60 becomes equal to or greater than the predetermined pressure, the notch 62 breaks off, i.e., performs an open operation, vapor and the water W (the liquid) in the thermosensitive tube 60 flow in the vapor room 31d, and the pressure in the thermosensitive tube 60 is input into the relief valve 30. Next, the vapor, etc., flowed in the vapor room 31d with equal to or greater than a predetermined pressure pushes the large-diameter part 32a of the valve element 32 against the compression coil spring 33, thereby opening the relief valve 30.

A force f1 (see FIG. 13) by the vapor, etc., flowed in the vapor room 31d and pushing the valve element 32 in the valve opening direction (the left) is given by calculating a product of the pressure by the vapor, etc., at the time of flow-in and an operation area S1 of the large-diameter part 32a that is pushed by the vapor, etc., in the valve opening direction. That is, for example, if the large-diameter part 32a is enlarged in the radial direction with the small-diameter part 32b remaining same, the operation area S1 becomes large, so that it is easy to change the setting that the relief valve 30 is opened even if the pressure by the vapor, etc., is low.

When a total of a force f2 (see FIG. 12) of hydrogen in the tank main body 10 pushing the valve element 32 in the valve opening direction and the force f1 by the vapor, etc., becomes greater than a force f3 by the compression coil spring 33 (i.e., f1+f2>f3), the valve element 32 slides to the left, and is separated from the valve seat 31a.

Figure 11:
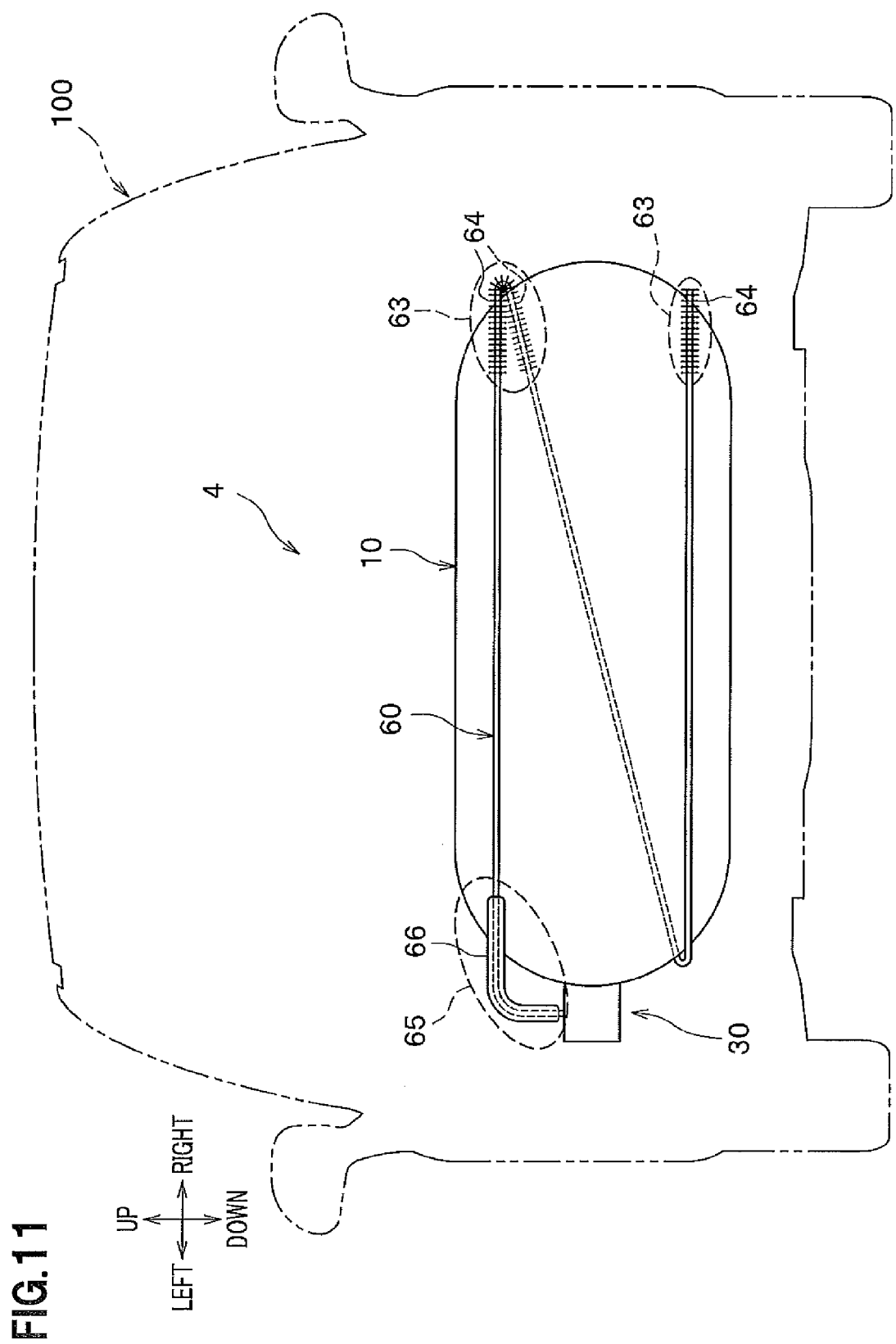
FIG. 11 is a side view of a hydrogen tank according to a fourth embodiment.

On the other hand, as shown in FIG. 11, the other end of the thermosensitive tube 60 extends to the right end (the other-end side) along the rear side portion of the external surface 13 (see FIG. 12) of the tank main body 10, continuously extends to the left end along the front side portion of the external surface 13, and continuously extends to the right end along the rear side portion of the external surface 13. Accordingly, even if heat is input from the right of the hydrogen tank 4, such heat can be rapidly detected by the thermosensitive tube 60.

Also, in the vehicle-width direction, fins 64, 64 for improving the sensitivity to heat are provided at respective right side portions 63, 63 of the thermosensitive tube 60 apart from the relief valve 30, and thus a high-sensitive treatment to heat is performed on the thermosensitive tube 60.

Accordingly, when heat is input to the right part of the fuel cell vehicle 100 apart from the relief valve 30, such heat is rapidly transferred to the thermo sensitive tube 60 through the fins 64, and the thermosensitive tube 60 can rapidly detect heat from the above-explained high heat source.

On the other hand, in the vehicle-width direction, a foam heat-insulating body 66 (a sponge) which lowers the sensitivity to heat and which has a heat-insulating property is provided at the left portion 65 of the thermosensitive tube 60 near the relief valve 30, and thus a low-sensitive treatment to heat is performed on the thermosensitive tube 60.

Accordingly, when heat is input from the left portion near the relief valve 30, the thermosensitive tube 60 is unlikely to detect such heat, so that the internal pressure thereof is unlikely to increase. However, such heat is transferred to the metal body 40 provided in the relief valve 30, and when the metal body 40 melts down, the relief valve 30 is opened. That is, opening the relief valve 30 based on whether or not the metal body 40 melts down takes precedence over opening the relief valve 30 based on pressure input into the relief valve 30 from the thermosensitive tube 60.

Figure 14:
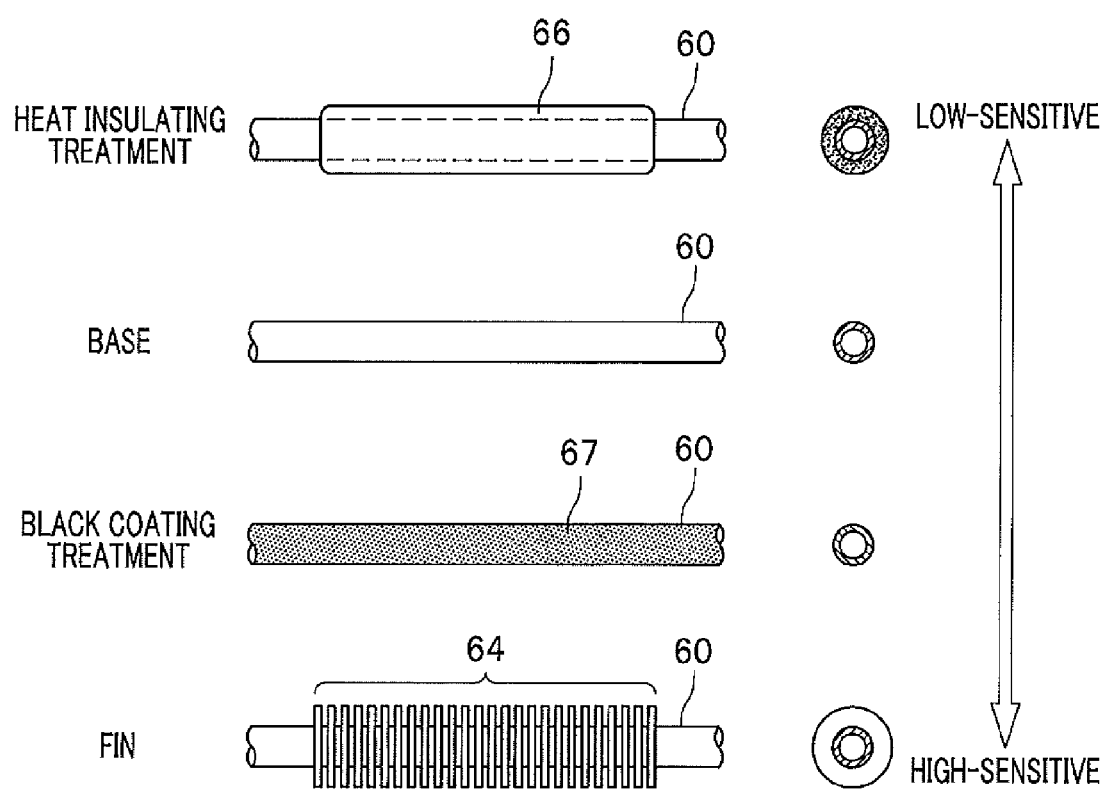
FIG. 14 is a diagram showing examples of low-sensitive treatment and high-sensitive treatment performed on a thermosensitive tube according to the fourth embodiment.

However, the specific examples of the high and low-sensitive treatments to the thermosensitive tube 60 are not limited to the fins 64 and the foam heat-insulating body 66. For example, as shown in FIG. 14, a high-sensitive treatment may be applied by painting the thermosensitive tube 60 with a black paint in order to form a black coating layer 67.

<<Operation and Effect of Hydrogen Tank>>

According to such a hydrogen tank 4, the following operation and effect can be accomplished.

For example, when heat is input from the right of the hydrogen tank 4, such heat is transferred to the thermo sensitive tube 60 and the water W (the liquid) filled therein through the fins 64. The temperature of the water W increases, and the water W boils at 100° C. That is, the water W is subjected to thermal expansion, and the pressure in the thermosensitive tube 60 increases. When the pressure in the thermosensitive tube 60 becomes equal to or greater than a predetermined pressure, the notch 62 breaks off, vapor (the gas) and the water W (the liquid) flow into the vapor room 31d, and a pressure is input into the relief valve 30 from the thermosensitive tube 60.

The vapor, etc., flowing in the vapor room 31d pushes the valve element 32 in the valve opening direction, and the relief valve 30 is opened. This causes hydrogen in the tank main body 10 to be released to the exterior, and thus the pressure in the tank main body 10 decreases.

The fourth embodiment of the present invention was explained above, but the present invention is not limited to this embodiment, and for example, can be modified as follows.

In the foregoing fourth embodiment, although the thermosensitive tube 60 employs a structure that the water W that is a liquid at a normal temperature and a normal pressure (a standard condition, 25° C., 1 atm) is filled in the thermosensitive tube 60, the present invention is not limited to this structure.

More specifically, the substance filled in the thermosensitive tube 60 may be any material which is boiled or sublimed near a target valve opening temperature, at which the relief valve 30 must be opened, in order to increase the pressure in the thermosensitive tube 60 to a predetermined pressure and which is not resolved at the target valve opening temperature. That is, the phase-change of a substance near the target valve opening temperature is not limited to from a liquid to a gas, but may be from a solid to a gas.

For example, such a substance may be hydrocarbon, alcohol, ether, chlorofluorocarbon, an oil, ammonium, or a mixture thereof.

Also, a wax or the like which is solid at a normal temperature and a normal pressure may be filled in the thermosensitive tube 60. According to a structure in which the solid substance is filled, an effect by a posture of the thermosensitive tube 60 (the fuel cell vehicle 100) can be further eliminated.

Also, as long as the operation for opening the valve is limited to once, a substance which is resolved at the target valve opening temperature but can increase the pressure in the thermosensitive tube 60 can be used.

Although vapor, etc., flowing from the thermosensitive tube 60 pushes the valve element 32 in the valve opening direction to open the relief valve 30 in the foregoing fourth embodiment, a structure in which the flowing vapor, etc., breaks a thin part of the relief valve in order to form a releasing hole communicated with the exterior, and hydrogen is released to the exterior through such a releasing opening, may be employed.

Figure 15:
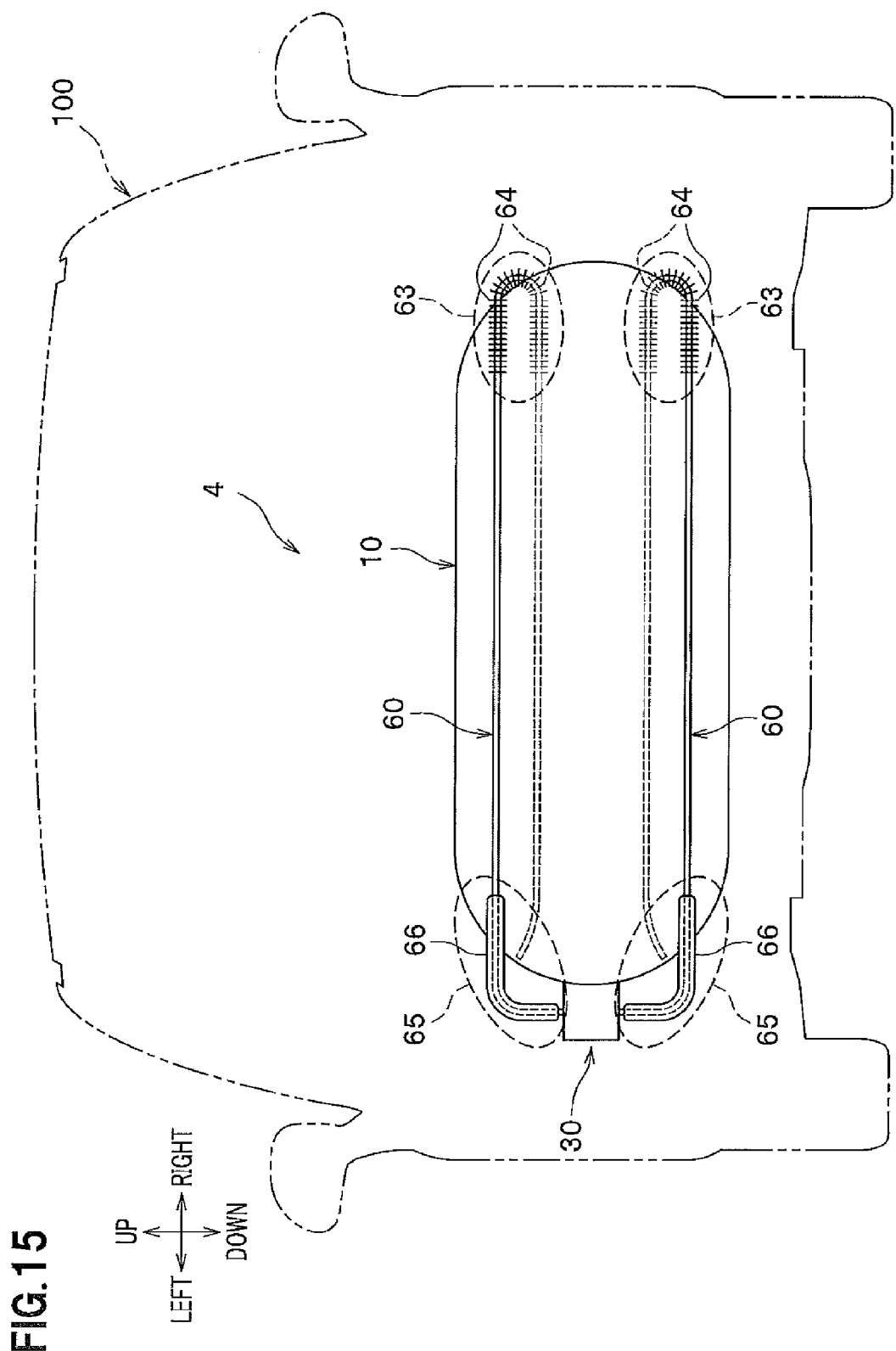
FIG. 15 is a side view of a hydrogen tank according to a modified example.

Although an example structure in which a thermosensitive tube 60 is connected to the vapor room 31d of the relief valve 30 was explained in the foregoing fourth embodiment, two thermosensitive tubes 60, 60 may be connected as shown in FIG. 15.

Although an example structure in which the metal body 40 that melts down at a predetermined temperature is provided in the relief valve 30 was explained in the foregoing fourth embodiment, a configuration in which no metal body 40 is provided may be provided as shown in FIG. 16.

Although an example configuration in which the thermosensitive tube 60 is connected to the relief valve 30 attached to the tank main body 10 filled with hydrogen was explained in the foregoing fourth embodiment, a configuration in which the thermosensitive tube 60 is connected to a relief valve attached to a high pressure gas tube where a high pressure gas flows may be employed.

What is claimed is:

1. A gas tank, comprising:
a tank main body filled with a gas;
a heat-insulating layer provided on an external surface of the tank main body;
a pressure-reduction device which is provided at one end of the tank main body, and which reduces a pressure in the tank main body by releasing the gas from the tank main body;
a transferring component which extends from the pressure-reduction device toward the other end of the tank main body, and which transfers heat and pressure; and
a meltable member provided in the pressure-reduction device, wherein the member melts when a temperature becomes equal to or greater than a predetermined temperature in order to cause the pressure-reduction device to release the gas from the tank main body,
wherein the transferring component includes a thermally expandable substance filled in the transferring component, and a pressure increasing together with a thermal expansion of the substance is transferred to the pressure-reduction device, and
wherein the substance thermally expands together with a phase-change when heated, and the pressure-reduction device obtains a thrust force for releasing the gas from the tank main body based on an increased pressure in the transferring component.

2. The gas tank according to claim 1, wherein the heat-insulating layer is formed by applying a thermofoamable heat-insulating paint on the external surface of the tank main body, starts foaming when a temperature increases, and becomes the heat-insulating layer.

3. The gas tank according to claim 1, wherein the heat-insulating layer includes a heat-insulating member fixed on the external surface of the tank main body.

4. The gas tank according to claim 1, wherein
the transferring component includes a part which constitutes the tank main body and which has a thermal conductivity, and
the pressure-reduction device is thermally connected to the transferring component, and
heat is transferred from the transferring component to the pressure-reduction device.

5. The gas tank according to claim 1, wherein the substance thermally expands when being boiled.

6. The gas tank according to claim 1, wherein the substance is a liquid at a selected temperature.

7. The gas tank according to claim 1, wherein the substance is a solid at a selected temperature.

8. The gas tank according to claim 1, wherein
the transferring component is formed in a tubular shape, and has one end connected to the pressure-reduction device, and
the one end is provided with an opening portion which is opened when an internal pressure of the transferring component becomes equal to or greater than a predetermined pressure, and which transfers a pressure by the substance to the pressure-reduction device.

9. The gas tank according to claim 1, wherein
a low-sensitive treatment for lowering a sensitivity to heat is performed on a portion of the transferring component near the pressure-reduction device, and
a high-sensitive treatment for improving the sensitivity to heat is performed on another portion of the transferring component apart from the pressure-reduction device.

10. The gas tank according to claim 1, wherein
the tank main body is installed in a vehicle, and
the pressure-reduction device is arranged at a right or a left of the tank main body in a vehicle-width direction.

* * * * *